United States Patent
Barak et al.

(10) Patent No.: US 8,475,714 B2
(45) Date of Patent: Jul. 2, 2013

(54) METHOD AND SYSTEM FOR SELECTIVE ULTRAVIOLET DISINFECTION

(75) Inventors: Limor Barak, Kfar Hanegid (IL); Vladimir Glukhman, Jerusalem (IL); Iian Wilf, Shoham (IL)

(73) Assignee: Atlantium Technologies Ltd., Beit-Shemesh (IL)

( * ) Notice: Subject to any disclaimer, the term of this patent is extended or adjusted under 35 U.S.C. 154(b) by 439 days.

(21) Appl. No.: 12/095,121

(22) PCT Filed: Jan. 13, 2008

(86) PCT No.: PCT/IL2008/000053
§ 371 (c)(1), (2), (4) Date: May 28, 2008

(87) PCT Pub. No.: WO2008/084487
PCT Pub. Date: Jul. 17, 2008

(65) Prior Publication Data
US 2010/0166600 A1    Jul. 1, 2010

Related U.S. Application Data

(60) Provisional application No. 60/879,795, filed on Jan. 11, 2007.

(51) Int. Cl.
| B08B 17/00 | (2006.01) |
| A61L 2/00  | (2006.01) |
| G01N 23/00 | (2006.01) |
| C02F 1/00  | (2006.01) |
| A01K 61/00 | (2006.01) |
| B01J 19/00 | (2006.01) |

(52) U.S. Cl.
USPC .......... 422/24; 422/1; 422/6; 422/22; 422/41; 422/119; 250/435; 250/455.11; 250/505.1; 210/739; 210/748.03; 210/748.04; 210/748.1; 210/748.11; 210/143; 119/200

(58) Field of Classification Search
USPC ............... 422/1, 6, 22, 24, 41, 105, 119, 292, 422/905; 250/435, 455.11, 505.1; 210/739, 210/748.03, 748.04, 748.1, 748.11, 143; 119/200
See application file for complete search history.

(56) References Cited

U.S. PATENT DOCUMENTS
| 5,353,745 A | * | 10/1994 | Fahs, II .................... 119/226 |
| 5,377,624 A | | 1/1995 | Craig et al. |
| 2004/0061069 A1 | | 4/2004 | Schalble et al. |
| 2005/0023482 A1 | | 2/2005 | Schulz |

FOREIGN PATENT DOCUMENTS
| JP | 2006 006211 A | 1/2006 |
| WO | WO 2008/050349 | 5/2008 |

OTHER PUBLICATIONS

Lilived et al., "Removal of particle-associated bacteria by prefiltration and ultraviolet irradiation", Aquaculture Research, Blackwell Science, Oxford, GB., vol. 30, Jan. 1, 1999, pp. 445-450 ISSN: 1355-557X.

International Search Report for International Application No. PCT/IL2008/000053. Date of Mailing Jun. 18, 2008.

* cited by examiner

*Primary Examiner* — Jill Warden
*Assistant Examiner* — Monzer Chorbaji
(74) *Attorney, Agent, or Firm* — Pearl Cohen Zedek Latzer, LLP

(57) ABSTRACT

According to embodiments of the invention, a selective ultraviolet disinfection method is provided. The method includes selecting operating parameters for an ultraviolet disinfection process of flowing liquid carrying first and second types of entities to affect the first type of entities while the second type of entities remains intact, illuminating the liquid with ultraviolet light according to the operating parameters and continuously adjusting the operating parameters based on real-time measurements of ultraviolet transmission and flow rate of the liquid.

8 Claims, 1 Drawing Sheet

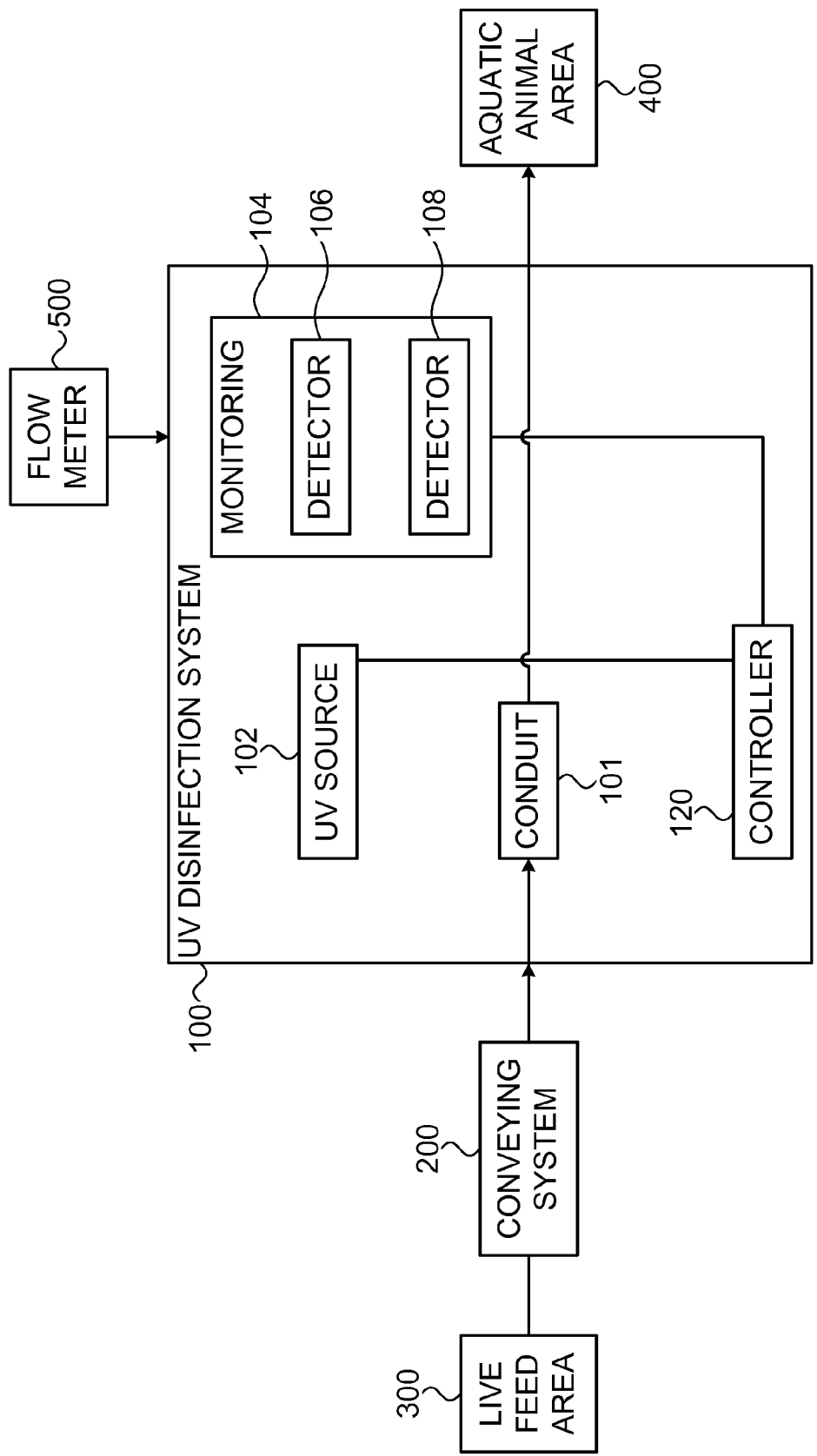

METHOD AND SYSTEM FOR SELECTIVE ULTRAVIOLET DISINFECTION

CROSS REFERENCE TO RELATED APPLICATIONS

This application is a National Phase Application of PCT International Application No. PCT/IL2008/000053, International Filing Date Jan. 13, 2008, claiming priority of U.S. Provisional Application No. 60/879,795, filed Jan. 11, 2007, the entire disclosure of which is incorporated herein by reference.

BACKGROUND OF THE INVENTION

Ultraviolet (UV) liquid disinfection has been long known to effect micro-organisms. The illumination of flowing liquid with UV light may cause inactivation of water-borne micro-organisms exposed to the light, provided that the light intensity and exposure duration are above a minimum dose level (often measured in units of miliJoules per square centimeter).

The UV exposure may initiate a photochemical reaction which effectively damages their DNA molecules to such an extent that cell division, and thus multiplication, can no longer occur. The relative effectiveness of UV light wavelengths for this process is known as the germicidal action spectrum. There are a wide variety of micro-organisms that vary in their structure and accordingly in their sensitivity to UV.

The selection of UV light characteristics and other parameters of the disinfection process, such as light intensity, light wavelength and duration depends primarily on the UV light doze necessary to achieve a required reduction in the number of specified micro-organism types ("kill rate", usually measured in terms of logs). Different minimum doze levels (UV exposures) are required for different micro-organisms to achieve a certain kill rate. The necessary UV doze level for many applications ranges between 10 mJ/cm2 and 100 mJ/cm2.

Further, for certain applications, for example, aqua agriculture applications, it may be desirable to inactivate one type of specified micro-organisms while keeping intact another type of s micro-organisms. Accordingly, the UV disinfection process should be monitored and controlled to guarantee that under changeable operating conditions such as flow rate of the liquid and UV light transmission, the ultraviolet dose would remain within a desired range suitable for the specific required application.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings in which:

FIG. 1 illustrates a conceptual illustration of a UV disinfection system within a feed supply arrangement for aquatic animals according to some demonstrative embodiments of the invention.

It will be appreciated that for simplicity and clarity of illustration, elements shown in the drawings have not necessarily been drawn accurately or to scale. For example, the dimensions of some of the elements may be exaggerated relative to other elements for clarity or several physical components included in one functional block or element. Further, where considered appropriate, reference numerals may be repeated among the drawings to indicate corresponding or analogous elements. Moreover, some of the blocks depicted in the drawings may be combined into a single function.

DETAILED DESCRIPTION OF EMBODIMENTS OF THE INVENTION

In the following detailed description, numerous specific details are set forth in order to provide a thorough understanding of the invention. However, it will be understood by those of ordinary skill in the art that the present invention may be practiced without these specific details. In other instances, well-known methods, procedures, components and circuits may not have been described in detail so as not to obscure the present invention.

It will be appreciated that the liquid disinfection process may include inactivation or removal of any organism, bacteria, micro-organism, being, creature, microbe, germ, virus, organic contaminator, non-organic contaminator, oxidizeable toxic or contaminator; any cumulative noxious species of biological or chemical origin; any oxidizing particle, fragment or element, e.g., Hydrogen peroxide or Titanium dioxide, intended to oxidize a contaminator and/or the like.

It will be appreciated that the term "entity" as used herein may refer to any water-borne living species, organism, bacteria, microorganism, being, creature, microbe, germ, virus, organic contaminator, non-organic contaminator, oxidizeable toxic or contaminator, any cumulative noxious species of biological or chemical origin, any oxidizing particle, fragment or element and/or the like.

According to embodiments of the invention, a method for selective UV disinfection is provided. The method may include selecting operating parameters for an ultraviolet disinfection process of flowing liquid carrying first and second types of entities to affect the first type of entities while the second type of entities remains intact. Then, illuminating the liquid with ultraviolet light according to the operating parameters and adjusting the operating parameters based on real-time measurements of ultraviolet transmission and flow rate of the liquid.

The selective UV disinfection process may be applicable to many applications, such as for example, aqua agriculture applications. According to an exemplary embodiment of the invention, a method of employing selective biological disinfection of contaminants (pathogens) found on live feed or in their liquid surroundings is provided. Such a method is applicable for inactivating pathogens having higher sensitivity to UV exposure than the live feed itself. According to embodiments of the invention, the selective UV disinfection process may include controlling the intensity of the UV light be maintain within a range in which only the contaminants are affected by UV exposure without affecting other entities in the treated liquid. Additionally, the selective UV disinfection process may include selecting a range of wavelengths and within the germicidal spectrum for which the contaminants are more sensitive to UV exposure.

Accordingly, the operating parameters of the disinfection process may be selected to affect only the pathogens, while the live feed itself is left unaffected by the UV light they are exposed. The operating parameters, such as light intensity may be selected so as the UV dose would remain within a range between the minimal UV dose required to achieve a desired kill rate of the pathogen and a maximal UV dose that still would not substantially affect the live feed.

For example, Vibrio, a pathogen existing in the environment of rotifers commonly used as live feed for aquatic animal larvae, although not harmful to the rotifers, is harmful to various types aquatic animals like fish and shrimps larvae. It was found that the Vibrio is more sensitive to UV light than the Rotifers and upon exposure to UV light, the Vibtio may be inactivated at an effective kill rate if exposed to a UV dose between 15 miliJoules/cm$^2$ and 60 miliJoules/cm$^2$. Exposure to UV dose above 60 miliJoules/cm$^2$ may also harm the rotifers. Other pathogens known to have sensitivity to UV exposure may include *Aeromonass* spp and Coliforms.

Non exhaustive list of entities used as live feed includes rotifers, brine shrimp, white worms, *Artemia*, nauplii (e.g. larvae of *Artemia*) or any other aquatic organisms from subphylum Crustacia or Phylum Rotifera and any other types of edible aquatic organisms. All these organisms are relatively small and so may themselves be present in the aquatic animal feed for digestion by larger organisms. In this case, these organisms may be one of the feed components or ingredients. The operation con of this invention is designed to affect only the contaminants, while the animal marine feed itself as well as their specific feed is left unaffected by the UV light they are exposed to.

The live feed may be used as feed for aquatic animals. The term "Aquatic Animals" refers any appropriate type of aquatic animal or cultured aquatic animals. Non-exhaustive list of such animals includes fish, young fish, larvae, shrimps, squid, mussels, oysters, cuttlefish, octopus, crayfish, prawns, shrimps, herrings, turbot, halibut, salmon, trout, bream, sole, bass, flounder, charr, lobsters or clams any other organism derived from the class Copepoda or Cephalopoda, Phylum Mollusca, subphylum Crustacea, Leander and Crangon and the like.

Reference is now made to FIG. 1, which illustrates a conceptual illustration of a UV disinfection system within a feed supply arrangement for aquatic animals according to embodiments of the invention. The feed supply arrangement may include a UV disinfection system 100 having water transmission monitoring capabilities for selectively disinfecting liquid carrying live feed when conveyed using any known conveying system 200 from the live feed area 300 to the aquatic animal area 400. The feed supply arrangement may further include a flow meter 500 to monitor the flow rate of the liquid.

The description below will be further illustrated with reference to an illustrative example of Rotifers (live feed) and Vibrio (pathogen). It should, however, be understood to a person skilled in the art, that the f illustrative example is not intended to limit the scope of the invention in any manner. Accordingly, embodiments of the invention are likewise applicable to may other biological systems and applications. Generally, Rotifers may be cultivated in water pools or tanks and may be conveyed to a fish pond by conveying system, which may include a pump.

In many instances, live feed area 300 may contain, other than the live food, types of contaminants that are pathogenic, such as for example, the Vibrio virus found in pools of Rotifers. It is therefore desired to eliminate or at least to reduce the amount of any such contaminants before conveying the live feed to the aquatic animal area 400. As known to those familiar with the art, the contaminants are found in the water as well as on the live feed. According to embodiments of the invention, during conveyance of the live feed from the live feed container to the aquatic animal area, the liquid carrying the live feed may pass through disinfection system 100 to be selectively disinfected. The process of disinfection may be monitored on-line to ensure exposure to substantially uniform dose distribution at the required range. The dose used is one which sufficiently inactivates the contaminants, while leaving the live feed unaffected.

UV system 100 may include a conduit 101 to carry flowing liquid to be disinfected and one or more UV sources 102 to illuminate the liquid within conduit 101. According to exemplary embodiments of the invention, conduit 101 may be made, at least partially, of a UV transparent material, such as quartz. UV source 102 may be located externally to UV-transparent conduit 101 adjacent a UV-transparent window capable of transmitting light emitted from UV source 102. The liquid within conduit 101 may act as a waveguide enabling at least part of the UV light emitted from UV source 102 to be totally-internally reflected at the interface of the UV-transparent conduit 101 and the air surrounding it.

Alternatively, UV source 102 may be surrounded by a UV-transparent sleeve positioned within conduit 101 substantially perpendicular to the axis of symmetry of conduit 101. In such a configuration, the liquid within conduit 101 may act as a waveguide and at least part of the light emitted from the UV light source 102 may be totally-internally reflected at the interface of the conduit 101 and the air surrounding it.

It should be understood to a person of ordinary skill in the art that the embodiments of disinfection system 100 described above do not limit the invention in this respect and any other UV disinfection system having for example a metal conduit may be used.

Disinfection system 100 may include a monitoring unit 104 having a lamp status detector 106 located in relative proximity to UV source 102 and a water transmission detector 108 to enable on-line real-time measurements of UV light transmittance of the liquid. The UV light transmittance of the liquid may be calculated in terms of Ultraviolet Water Transmission (UVT), commonly used in the UV industry, defined as the UV transmittance of a one-centimeter water column at a wavelength of 254 nm. System 100 may further include a controller 120 to receive measurement results from detectors 106, 108 and to monitor the disinfection process based on the received results.

During the disinfection process, the power of light emitted from UV source 102 may be detected by detectors 106 and 108. The measurement results may be provided to controller 120 to be used for calculating real-time UV water transmission (UVT) values, as described, for example at International patent application PCT/IL2007/001305, incorporated herein by reference. Using the UVT values and other parameters including the flow rate of the liquid the UV doze may be calculated periodically. If the calculated UV doze values are not within a required range, controller 120 may adjust one or more operating parameters of the system including for example, light intensity, UV source power, water capacity and others. Additionally, controller 120 may send an alert notification to a human operator.

While certain features of the invention have been illustrated and described herein, many modifications, substitutions, changes, and equivalents may occur to those of ordinary skill in the art. It is, therefore, to be understood that the appended claims are intended to cover all such modifications and changes as fall within the true spirit of the invention.

What is claimed is:

1. An ultraviolet disinfection method comprising:
   determining for a selective ultraviolet disinfection process a wavelength range such that a first type of entities is more sensitive, in that wavelength range, to light exposure than a second type of entities;
   determining light intensity for the selective ultraviolet disinfection process; and illuminating flowing liquid carrying the first and second types of entities with ultraviolet light in the determined wavelength range at the determined light intensity so as to affect the first type of entities while the second type of entities remain intact during illumination.

2. The method of claim 1 further comprising:

adjusting the light intensity based on real-time measurements of ultraviolet transmission and flow rate of the liquid so as a UV dose remains within a range between a minimal UV dose required to achieve a desired kill rate of the first entity and a maximal UV dose that does not substantially affect the second entity.

3. The method of claim 2, wherein the operating parameters are adjusted so as a UV dose remains within a range between a minimal UV dose required to achieve a desired kill rate of the first entity and a maximal UV dose that does not substantially affect the second entity.

4. The method of claim 2, wherein the first type of entities includes Vibtio, the second type of entities includes rotifers and the UV dose is maintained below 60 miliJoules/cm2.

5. The method of claim 1, comprising:

adjusting operating parameters based on real-time measurements of ultraviolet transmission and flow rate of the liquid, if calculated UV doze values are not within a required range.

6. The method of claim 1, wherein the first type of entities includes pathogens.

7. The method of claim 1, wherein the second type of entities includes live feed for aquatic animals.

8. The method according to claim 7 further comprising:

receiving the flowing liquid from a live feed area and directing the flowing liquid to an aquatic animal area.

\* \* \* \* \*